Aug. 4, 1942.    K. L. WOODMAN    2,291,857
COOKING APPLIANCE
Filed Nov. 21, 1939    2 Sheets-Sheet 1
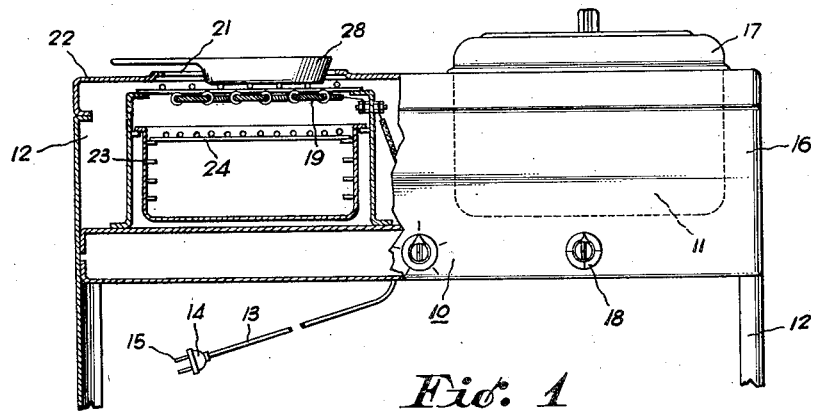
Fig. 1
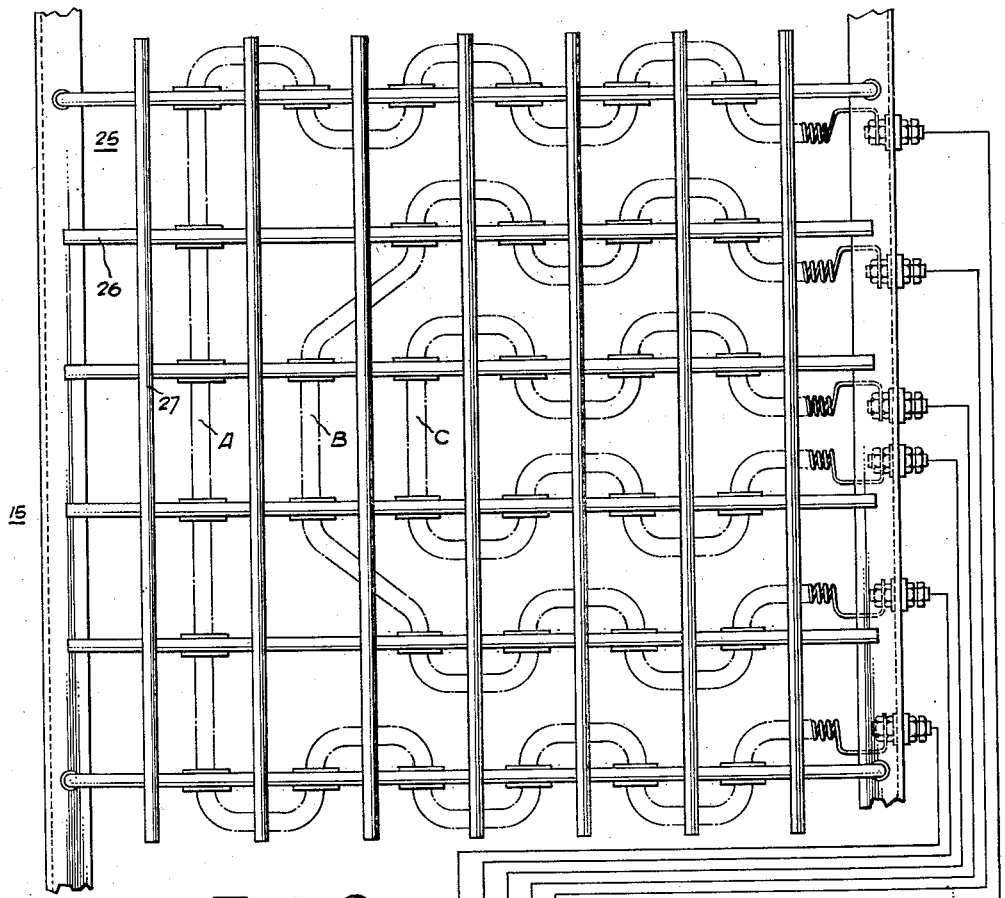
Fig. 2
WITNESSES:
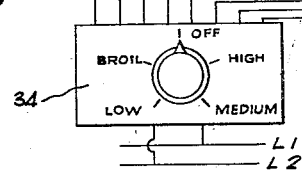
INVENTOR
KENNETH L. WOODMAN.
BY
ATTORNEY

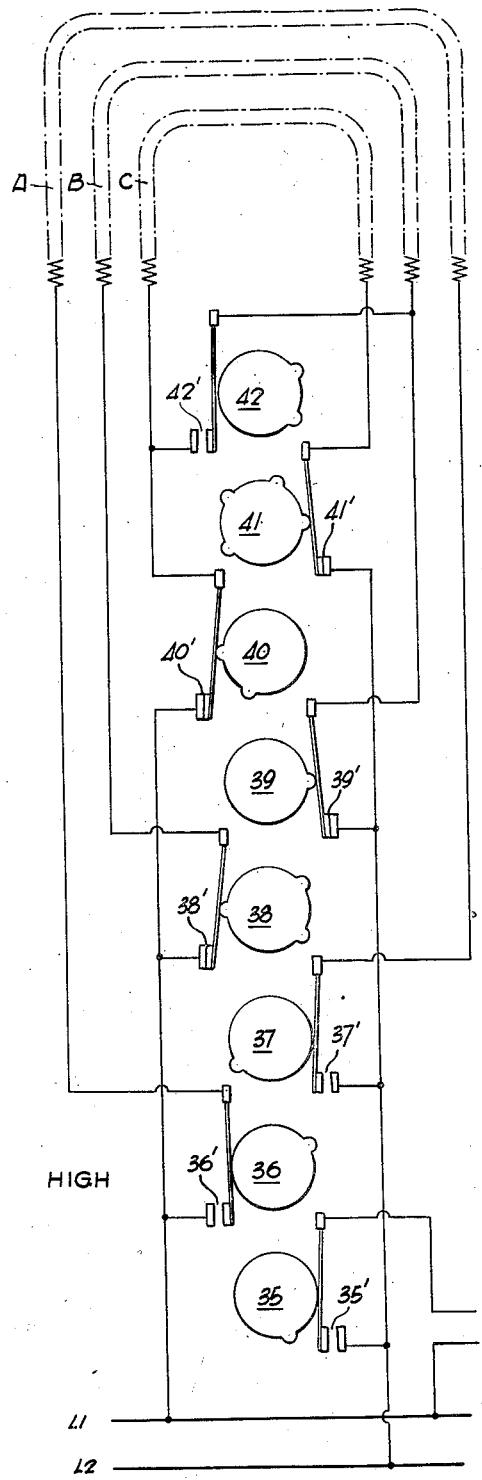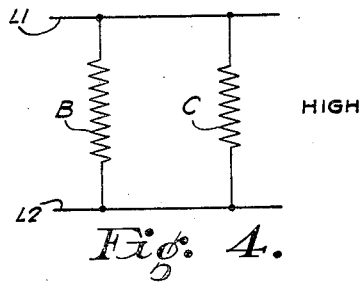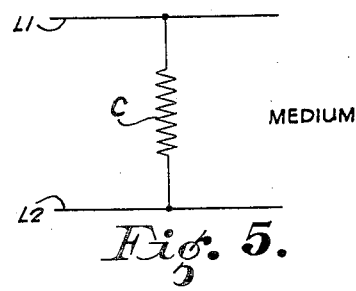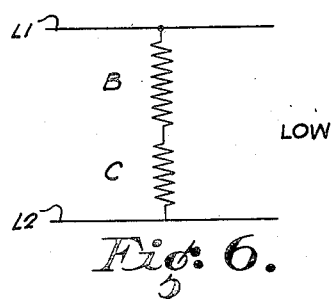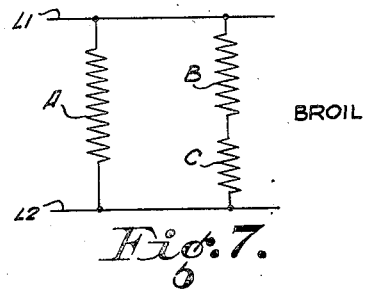

Patented Aug. 4, 1942

2,291,857

UNITED STATES PATENT OFFICE 2,291,857

COOKING APPLIANCE

Kenneth L. Woodman, Mansfield, Ohio, assignor to Westinghouse Electric & Manufacturing Company, East Pittsburgh, Pa., a corporation of Pennsylvania Application November 21, 1939, Serial No. 305,528

5 Claims. (Cl. 219—37)

My invention relates to a cooking appliance, more particularly to a cooking appliance having a heating unit which is adapted to direct heat upwardly for surface cooking and to radiate heat downwardly for broiling, and it has for an object to provide an improved cooking appliance of the character set forth.

A more particular object is to provide a heating unit of the character set forth and a circuit arrangement therefor which are adapted to provide efficient heating when used for surface cooking.

In accordance with my invention, I provide a heating unit wherein the heat is concentrated within a reduced area of the heating unit when it is used for surface cooking, so that the heat may be more effectively utilized by an ordinary cooking vessel of the type used for surface cooking.

These and other objects are effected by my invention as will be apparent from the following description and claims taken in connection with the accompanying drawings, forming a part of this application, in which:

Fig. 1 is a front elevation, with parts in section, of a cooking appliance in accordance with my invention;

Fig. 2 is a plan view of the heating unit with the switch and connections indicated diagrammatically;

Fig. 3 is a diagrammatic view of the switch contacts and their connections with the heating elements; and Figs. 4 to 7 are diagrammatic views showing the circuit arrangements effected by the switch in the high, medium, low, and broil positions, respectively.

Referring to Fig. 1, I show a cooking appliance 10, in which there is incorporated an electric roaster 11 and a combination broiler and hotplate 12. This appliance may, therefore, be referred to as a roaster-broiler hotplate. The appliance 10 is provided with electric cord 13 to which there is attached at its outer end a conventional plug 14 having prongs 15 and adapted to be plugged into any conventional convenient outlet of the type commonly provided in houses wired for electric current. The appliance 10 is, therefore, of the type commonly referred to as a lamp socket appliance, as distinguished from the conventional electric range which is permanently wired to the source of electric current. The current consumption of an appliance of this type is usually limited to a specified maximum, which is commonly 1650 watts.

The roaster 11 is incorporated in the right-hand half of the body portion 16 of the appliance 10, as indicated in Fig. 1, and is provided with a removable cover 17. It is also provided with a suitable switch 18, which may be both thermostatically and automatically controlled. In the present embodiment, the current consumption of the roaster is 1650 watts.

The combination broiler and hotplate comprises a heating unit 19 disposed immediately below and in registry with an opening 21 formed in the top wall or platform 22 of the body portion 16. A sliding drawer 23 having a suitable broiling rack 24 is disposed beneath the heating unit to support articles of food to be broiled.

The heating unit 19 includes, as shown in Fig. 2, a frame 25 which comprises bars 26 and 27 extending at right angles and welded to each other to form a skeleton framework. This frame is adapted to support cooking vessels placed directly thereon, for example, an ordinary frying pan 28.

The heating unit further comprises three electric heating elements A, B and C. The three heating elements together are distributed over an area suitable for broiling articles of food on the rack 24. The heating elements B and C are arranged in a concentrated portion of that area, which portion is adapted to be covered by a cooking vessel of ordinary size used for surface cooking, such as the frying pan 28. The three heating elements may be arranged, for example, in nested relation, as shown in Fig. 2, wherein the intermediate element B extends about three sides of the innermost element C and the outermost element A extends about three sides of the intermediate element B.

In the present embodiment, each of the heating elements B and C has a capacity of 825 watts when it is connected directly across the line conductors $L_1$ and $L_2$ incorporated in the cord 13 and the cord is connected to a source of current at 115 volts. The heating element A has a capacity of 1237½ watts when so connected.

A switch 34 is provided to control the energization of the heating elements. This switch may be of any suitable construction and, by way of example, I have shown a rotary switch comprising cam discs 35 to 42 controlling associated switch contacts 35' to 42'. These discs are mounted on a common shaft by which they are rotated in unison to five different positions, which I will term the "off," "high," "medium," "low," and "broil" positions. The cams on these discs are disposed to provide the desired connections for each position of the switch, as described hereinafter.

The contacts 35' are adapted to open the circuit extending through switch 18 to the roaster 11 whenever the switch 34 is adjusted to any one of its four heat positions, in order to avoid exceeding the maximum value of 1650 watts. The contacts 36' and 37' control the connection of the heating element A to the conductors $L_1$ and $L_2$, respectively. Similarly, the contacts 38' and 39' control the element B and the contacts 40' and 41' control the element C. The contacts 42' control the series connection between the elements B and C. The switch 34 is constructed and arranged so that when any heating element is de-energized by the switch, it is isolated from both line conductors $L_1$ and $L_2$, thereby eliminating the possibility of a person obtaining a shock when touching an element as might be the case if the element were disconnected from only one line conductor.

In the "off" position of the switch, all of the contacts 36' to 42' are open and the elements A, B, and C are disconnected from both sides of the line. The contacts 35' are closed to complete the circuit to the switch 18, so that the latter may control the supply of current to the roaster 11.

In the "high" position, shown in Fig. 3, the contacts 38' to 41' are closed to connect the heating elements B and C across the line conductors in parallel with each other, as represented in Fig. 4. Each of the elements B and C consumes 825 watts, so that the maximum wattage of 1650 is concentrated within the two heating elements B and C within the reduced portion of the unit which is adapted to be used for surface cooking. Accordingly, the maximum heat permitted of the appliance may be concentrated on a vessel placed over such reduced portion.

In the next or "medium" position of the switch, the contacts 40' and 41' are closed to connect the heating element C alone across the line conductors, as represented in Fig. 5, to provide the heat equivalent of 825 watts. Alternatively, the heating element B may be energized instead of the element C.

In the "low" position, the contacts 38', 42' and 41' are closed to connect the elements B and C in series to the line conductors, as represented in Fig. 6. The heating elements B and C provide the heat equivalent of 412½ watts.

In the "broil" position of the switch, the heating element A is connected across the line conductors to provide the heating equivalent of 1237½ watts. The heating elements B and C are connected in series with each other and across the line conductors in parallel with the heating element A, as indicated in Fig. 7. The elements B and C together consume 412½ watts, so that the three together provide the heat equivalent of 1650 watts, the maximum permissible current consumption. In this position of the switch, all three heating elements are energized and provide distributed heat for broiling articles of food placed on the rack 24. Tests have shown that an even temperature distribution can be obtained with this circuit arrangement.

While I have shown my invention in but one form, it will be obvious to those skilled in the art that it is not so limited, but is susceptible of various changes and modifications without departing from the spirit thereof, and I desire, therefore, that only such limitations shall be placed thereupon as are specifically set forth in the appended claims.

What I claim is:

1. A cooking appliance comprising a substantially flat and horizontally mounted heating device comprising first heating elements and one or more second heating elements distributed throughout the heating area of the heating device with the first heating elements concentrated in a portion of said area suitable for surface cooking, means for supporting a cooking vessel above said first heating elements to be heated by the latter, means for supporting articles of food below said heating device in a manner suitable for broiling, and switch means for controlling the connection of said heating elements to a source of electrical energy, said switch means providing connections such that, in each position of the switch means, the current drawn by the connected heating element or elements does not exceed a predetermined permissible value which is less than the total current of the several elements when individually connected to said source, in one position at least a part of the first elements draws a reduced current and the second element or elements are energized so that the heating device provides distributed heat throughout the area thereof for broiling, and in other positions, currents of different values are drawn by at least a part of the first elements and the second element or elements are not connected, so that the heating device provides different heats in a reduced area for surface cooking.

2. A cooking appliance comprising a substantially flat and horizontally mounted heating device comprising two first heating elements and one second heating element, the three heating elements being distributed throughout the heating area of the heating device with the two first heating elements concentrated in a portion of said area suitable for surface cooking, means for supporting a cooking vessel above said two first heating elements to be heated by the same, means for supporting articles of food below said heating device in a manner suitable for broiling, and switch means for controlling the connection of said heating elements to a source of electrical energy, said switch means providing connections such that, in each position of the switch means, the current drawn by the connected heating element or elements does not exceed a predetermined permissible value which is substantially less than the total current of the several elements when individually connected to said source, in one position both first elements are energized to provide a high heat for surface cooking and the second element is not energized, in a second position a first element or elements are energized to provide a reduced heat for surface cooking and the second element is not energized, and in a third position a first element or elements are energized to provide a heat less than the heat provided by them in the first position and the second element is energized to provide a distributed heat suitable for broiling.

3. An electrical heating device comprising first and second heating elements disposed in a concentrated portion of the heating area of the heating device, and a third heating element disposed in the remaining portion of said heating area, and switch means for connecting said heating elements to a pair of electrical supply conductors constructed and arranged so as, in a first position thereof, to connect the first and second heating elements in series with each other to said pair of electrical supply conductors, in a second position to connect said first heating element alone to said conductors, in a third position to connect the first and second heating elements only to said conductors in parallel with each other to provide a maximum heat output, and in a fourth position to connect said first and second heating elements in series to said conductors and to connect said third element to said conductors in parallel with the serially connected first and second elements to provide substantially the same heat output as in the third position.

4. A cooking appliance comprising a substantially flat and horizontally mounted heating device comprising a first heating portion including at least two heating elements and a second heating portion including at least one electric heating element, the heating elements being distributed throughout the heating area of the heating device with the first heating portion concentrated in a portion of said heating area suitable for surface heating, means for supporting a cooking vessel above said first heating portion to be heated by the same, means for supporting articles of food below said heating device in a manner suitable for broiling, and switch means for controlling the connection of said heating elements to a source of electrical energy, said switch means providing connections such that, in each position of the switch means, the current drawn by the connected heating element or elements does not exceed a predetermined permissible value which is substantially less than the total current of the several elements when individually connected to said source, in one position the first heating portion is energized to provide a high heat for surface cooking and the second heating portion is not energized, in a second position the first heating portion is energized to provide a reduced heat for surface cooking and the second heating portion is not energized, and in a third position the first heating portion is energized to provide a heat less than the heat provided by it in the first position and the second heating portion is energized to provide a distributed heat suitable for broiling.

5. A cooking appliance comprising a heating device including a first heating portion including at least two electric heating elements and a second heating portion including at least one electric heating element, the heating elements being distributed throughout the area of the heating device with the first heating portion concentrated in a portion of said heating area, and switch means for controlling the connection of said heating elements to a source of electrical energy, said switch means providing connections such that, in each position of the switch means, the current drawn by the connected heating element or elements does not exceed a predetermined permissible value which is substantially less than the total current of the several elements when individually connected to said source, in a first position the first heating portion is energized to provide a maximum heat output and the second heating portion is not energized, in a second position the first heating portion is energized to provide a reduced heat output and the second heating portion is not energized, and in a third position the first heating portion is energized to provide a heat output less than the heat provided by it in the first position and the second heating portion is energized to provide a distributed heat throughout said heating area, the combined heat output of said portions in said third position being substantially the same as the heat output in said first position.

KENNETH L. WOODMAN.